May 27, 1969
E. J. KOCH
3,446,056
METHOD AND APPARATUS FOR DETERMINING EQUILIBRIUM
TEMPERATURE-PRESSURE DATA OF VOLATILE LIQUIDS
Filed March 24, 1965
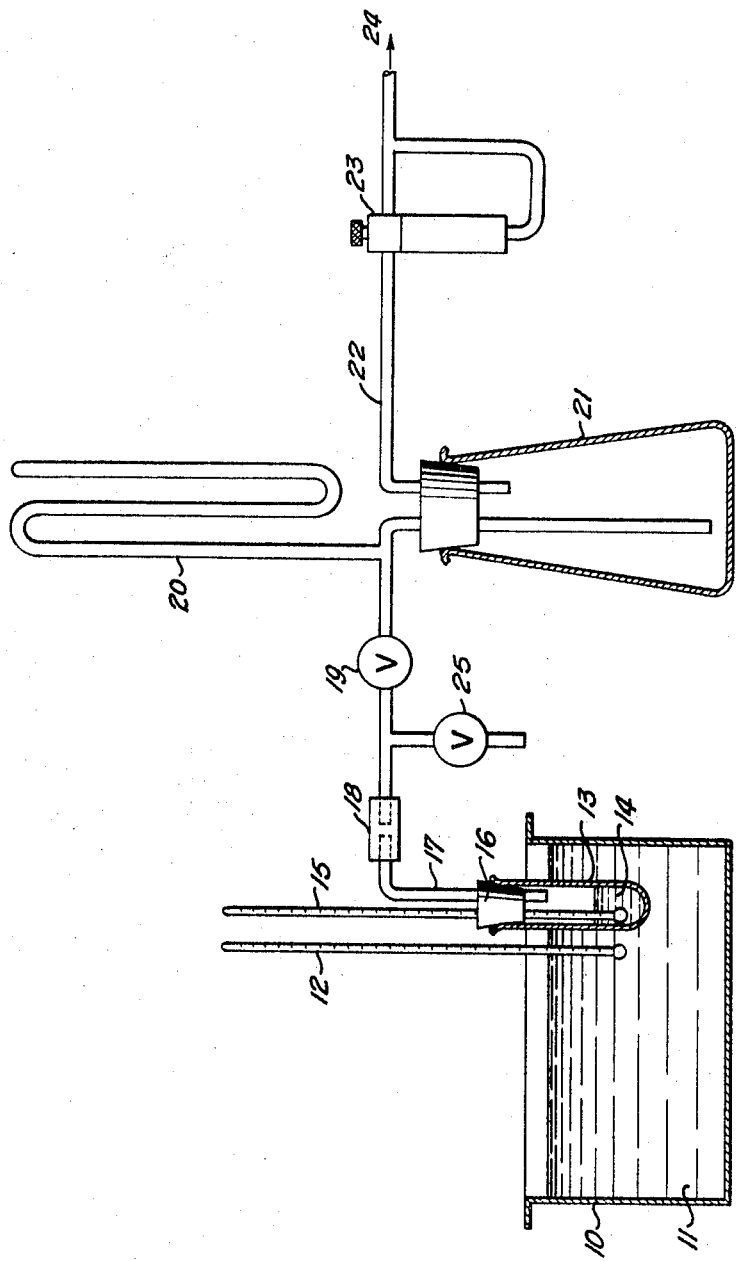
INVENTOR
Edward James Koch
BY *Edward James Koch*

United States Patent Office 3,446,056
Patented May 27, 1969

3,446,056
METHOD AND APPARATUS FOR DETERMINING EQUILIBRIUM TEMPERATURE-PRESSURE DATA OF VOLATILE LIQUIDS
Edward James Koch, 5518 Melshire Drive, Dallas, Tex. 75230
Filed Mar. 24, 1965, Ser. No. 442,447
Int. Cl. G01n 25/02
U.S. Cl. 73—17                    3 Claims

ABSTRACT OF THE DISCLOSURE

A method, together with the necessary apparatus, is disclosed, which provides for the determination of equilibrium temperature-pressure data of volatile liquid systems. Said method involves the observation of the lowering of the temperature of at least two samples of said liquid when such samples are suddenly subjected to a reduced pressure at which the liquid will boil. Variations in the lowering of the sample temperatures are made by using different initial sample temperatures or by submitting the samples to different reduced pressures. Results obtained are then extrapolated to zero sample temperature change to obtain equilibrium temperature-pressure data.

---

This invention relates to a novel method and the equipment used to determine the equilibrium temperature-pressure data of volatile liquids. More particularly, this invention relates to a method for accurately determining the boiling temperature of a volatile liquid at predetermined pressures, or the vapor pressure of a volatile liquid at a predetermined temperature.

Accurate determination of temperature-pressure data, particularly, at pressures other than ambient pressures, is difficult and time-consuming. Static methods in which the liquid is boiled in a container containing said liquid and a thermometer frequently lead to substantial errors brought about by either superheating and/or a change in the composition of the liquid due to vaporization of a portion of the liquid. More elaborate and costly equipment requiring skilled technicians is frequently used.

In the design of chemical processing plants accurate data is frequently required to provide a basis for calculations involving distillation equipment. Such data is frequently unavailable in the literature, particularly, in those cases involving pressures other than atmospheric pressure.

The object of this invention is to provide for the necessary equipment and a method for determining the boiling point of a liquid at a preselected pressure or the equilibrium vapor pressure of a liquid at a preselected temperature. It is another object of this invention to provide for a low-cost, simple and quick method of determining equilibrium temperature-pressure data of any liquid system. A further object of this invention is to provide for an analytical tool to determine the concentration of known components in a simple liquid system. Other objects and advantages of this invention will become apparent to those skilled in the art by virtue of the disclosure which follows.

If a liquid at a given pressure is heated to a temperature above the boiling point of said liquid at a second pressure lower than said given pressure, but below the boiling point of the liquid at said given temperature, and the pressure is suddenly reduced to the said second pressure, the liquid will boil and the temperature of the liquid will drop because the energy of the sensible heat in said liquid will be converted and utilized in the heat of vaporization. Generally, except in the case of a pure liquid, the composition of the equilibrium vapor is different than that of the liquid, causing a change in the composition of said liquid.

The amount of said temperature drop is dependent on several factors. First, the excess sensible heat as determined by the difference in the temperature of the liquid prior to lowering the pressure and the true equilibrium temperature at the second pressure. Second, the flow of heat into or out of the liquid by virtue of the temperature of the medium surrounding the system. Third, the change in the heat of vaporization brought about by the changing concentrations of the components in the system. If the temperature of the liquid is substantially higher than the true equilibrium temperature at the second pressure, the temperature drop will be large. As the starting temperature of the liquid approaches the true equilibrium temperature of the liquid at the second pressure, the change in temperature of the liquid will approach zero.

Thus, it was found that the true boiling point of a liquid at a controlled pressure could be determined by heating samples of said liquids to two or more temperatures above the equilibrium boiling point of the liquid at the desired pressure and determining the change in temperature of said samples when the pressure was suddenly reduced to said desired pressure and extrapolating the results to a zero change in temperature.

This invention is further explained in connection with the accompanying figure which represents an arrangement of apparatus for determining the equilibrium vapor pressure and temperature of a volatile liquid. In the figure, number 10 represents the container for a liquid bath material 11 which is used to heat or cool sample material 14 in sample container 13. Thermometers 12 and 15 are used respectively to determine the temperatures of bath 11 and sample 14. Stopper 16 through which thermometer 15 and delivery tube 17 are inserted is used to close the container 13. Delivery tube 17 is connected preferably by means of a flexible connector 18 to trap 21 which can be isolated from the sample container 13 by means of valve 19. An absolute pressure measuring device 20 is connected to the line between valves 19 and trap 21. The outlet of trap 22 is connected to a source of vacuum 24 (not shown) through a pressure controlling device 23. Valve 25 is used to allow air to enter the system, permitting easy removal of sample container 13 after completion of a test. The equipment described is capable of being used to determine:

(A) The approximate equilibrium vapor pressure of a sample at a predetermined temperature.

(B) The precise equilibrium vapor pressure of a sample at a predetermined temperature.

(C) The approximate equilibrium temperature of a sample at a predetermined pressure.

(D) The precise equilibrium temperature of a sample at a predetermined pressure.

The uses of the method and equipment can best be shown by examples.

PROCEDURE 1

The determination of the approximate equilibrium vapor pressure of a sample at a predetermined temperature is as follows:

(A) With valves 19 and 25 closed, a sample is placed in container 13, stopper 16 is inserted and outlet tube 17 connected to the system.

(B) The bath 11 is set at the predetermined temperature and the sample 14 is allowed to reach the bath temperature.

(C) Valve 19 is opened and the source of vacuum applied.

(D) Control 23 is adjusted so that the pressure of the system is gradually reduced.

(E) The approximate equilibrium vapor pressure as shown on the measuring means 20 is noted when the sample begins to boil.

*Example 1*

Using 3 cc. of benzene as a sample at 30° C. following Procedure 1, a mercury monometer read 116 mm. Hg when the sample began to boil.

PROCEDURE 2

The determination of the precise equilibrium vapor pressure of a sample at a predetermined temperature is as follows:

(A) With valves 19 and 25 closed, a sample is placed in container 13, stopper 16 is inserted and outlet tube 17 connected to the system.

(B) The bath 11 is set at the predetermined temperature below the boiling point of said sample at atmospheric pressure and the sample 14 is allowed to reach the bath temperature.

(C) A source of vacuum is applied and adjusted by means of control 23 to a value of about 10 to 20 mm. Hg below the approximate equilibrium vapor pressure of the sample at the predetermined temperature.

(D) Valve 19 is then opened to reduce the pressure over the sample and cause the liquid to boil. The temperature reading on thermometer 15 is watched and the lowest temperature reached is noted.

(E) A fresh sample is placed in container 13 and steps (A) and (B) above are repeated.

(F) The pressure of the system is adjusted to a value approximately midway between that used in step (C) and the approximate equilibrium vapor pressure.

(G) Valve 19 is then opened. The temperature reading on thermometer 15 is watched and the lowest temperature reached is noted.

(H) The equilibrium vapor pressure can then be calculated by determining the value of the vapor pressure at zero temperature change or graphically by plotting temperature change versus pressure and extrapolating to zero change in temperature.

*Example 2*

Using 3 cc. of benzene as a sample at 30° C. with a preset pressure of 100 mm. Hg, the temperature of the sample dropped 3.80° C. to 26.2° C. When the procedure was repeated with a fresh sample at 110 mm. Hg, the temperature dropped 1.75° C. to 28.25° C. The value of the true equilibrium vapor pressure at 30° C. was calculated to be 118.5 mm. Hg.

PROCEDURE 3

The determination of the approximate boiling point of a liquid sample at a predetermined pressure is as follows:

(A) With valve 19 closed, adjust the pressure of the system to the predetermined pressure.

(B) Place sample in container 13 and connect to the system.

(C) Open valve 19.

(D) Heat sample 14 by raising the temperature of bath 11 until the liquid begins to boil. Note the approximate temperature on thermometer 15.

*Example 3*

Following Procedure 3, a sample liquid containing ammonia, copper, cellulose and water was found to boil at 48° C. at 200 mm. Hg.

PROCEDURE 4

The determination of the precise boiling point of a liquid sample at a predetermined pressure is as follows:

(A) With valve 19 closed, adjust the pressure of the system to the predetermined pressure.

(B) Place sample in container 13 and connect to the system.

(C) Raise the temperature of sample 14 by means of bath 11 to approximately 5 to 10° C. above the approximate boiling point at the predetermined pressure. Note the temperature on thermometer 15.

(D) Open valve 19. The reduced pressure over the sample will cause the liquid to boil.

(E) Note the lowest temperature reached on thermometer 15.

(F) Place fresh sample in sample container.

(G) Repeat steps (A) and (B).

(H) Adjust the temperature of the sample to + or −2° C. of the value obtained in step (E). Note the temperature on thermometer 15.

(I) Open valve 19.

(J) Note the lowest temperature reached on thermometer 12.

(K) Determine the precise boiling point by calculating its value at zero temperature change or graphically by plotting initial temperature versus lowest temperature reached and extrapolating to zero change in temperature.

*Example 4*

A sample of the same material as in Example 3 was used with the pressure set at 200 mm. Hg, with an initial temperature of 55.0° C. The lowest temperature reached was 50.0° C. With a fresh sample, the test was repeated with an initial temperature of 50.0° C. In the second test, the temperature dropped to 48.0° C. Extrapolating this data to zero temperature change, the boiling point of the sample was found to be 46.85° C. at 200 mm. Hg.

It will be obvious to those skilled in the art that the methods described above can be used in analyzing liquid systems in which the components are known but the concentrations are unknown. For example, by using the methods of Procedure 2 or Procedure 4, data can be obtained with solutions of known composition so that a graph of concentration versus pressure at a constant temperature or a graph of concentration versus temperature at a constant pressure may be made. Once either graph is prepared, either of the methods described may be used on a solution in which the concentrations are unknown. Aqueous salt solutions can be analyzed since the quantity of salt in the solution will affect the vapor pressure of the solution at a given temperature or the boiling point of the solution at a given pressure.

The precision of the methods will naturally be dependent upon the precision of the temperature and pressure measuring means, as well as the ability of the pressure controller to maintain a preset pressure in the system. While thermometers and a monometer are depicted in the figure, any other suitable instrument may be used for measuring the temperatures and pressures, and if desired, recording instruments may be utilized.

As described above, two points were determined and the change in temperature extrapolated to zero change. This assumes a linear relation in the change of temperature over the range of tests. While for most purposes this method is satisfactory, greater precision may be obtained by securing additional data using other starting temperatures. While equations can be established for three or more points, the time required is usually excessive and the graphic method of extrapolating to zero change in temperature is preferred.

Again, if extreme precision is not required, it is usually desirable to make the test when the temperature of the sample is within about 0.5° C. of the temperature of the bath because of the excessive time required for the sample to reach the precise bath temperature.

The reproducibility and accuracy of the method of the proposed invention can be further improved by the use of an automatically-driven valve 19 to provide for a consistent rate of application of the controlled pressure to the sample container.

I claim:

1. A method for determining the equilibrium vapor pressure of a volatile liquid at a controlled temperature, said controlled temperature being below the boiling point of said liquid at atmospheric pressure, said method comprising heating a sample of liquid in a colsed vessel to said controlled temperature reducing the pressure in said vessel to a first value below the approximate equilibrium vapor pressure of said liquid at the controlled temperature so as to cause boiling of the liquid, observing the resulting lowering of the temperature of said liquid, heating a second sample to said controlled temperature, reducing the pressure in said vessel to a value intermediate of said first value and the approximate equilibrium vapor pressure, again observing the lowering of the temperature of said liquid and calculating from the observed temperature changes and pressure data the equilibrium vapor pressure of the liquid as that pressure at which there would be no lowering of the temperature in said liquid.

2. A method for determining the true boiling point of a volatile liquid at a controlled pressure which comprises heating a sample of said liquid in a closed vessel at a first temperature above the approximate equilibrium boiling point of said liquid at the controlled pressure, reducing the pressure in said vessel to said desired control pressure, observing the resulting lowering of the temperature of said liquid, heating a second sample of said liquid in said closed vessel to a temperature intermediate of said first temperature and the approximate equilibrium boiling points of said liquid, reducing the pressure in said vessel to said desired controlled pressure, again observing the resulting lowering of the temperature of the liquid and calculating from the observed temperature change data the true boiling temperature of said liquid at which there would be no lowering of the temperature in said liquid when the pressure is reduced to said controlled pressure.

3. Apparatus for determining equilibrium temperature-vapor pressure data of a volatile liquid comprising a means for controlling the temperature of a liquid bath, means disposed in said bath for measuring the temperature thereof, a closed vessel liquid sample holder substantially immersed in said bath, means for measuring the temperature, of a volatile liquid sample in said sample holder, means for measuring the pressure in said closed sample holder, a source of vacuum, means including valves connecting said vacuum source to said closed sample holder to permit reduction of the pressure therein, and means for controlling said reduced pressure to values below the normal vapor pressure of said volatile liquid at a given temperature.

References Cited

UNITED STATES PATENTS 3,200,638  8/1965  De Haut _____ 73—64

OTHER REFERENCES

Schuster, Arthur and Lees, Charles A.: Exercises in Practical Physics; (1915), pp. 112–115.

Ganot: Physics Experimental and Applied, translated by E. Atkinson, 1898, pp. 341–343.

Bridgeman, Oscar C. and White, Hobart S.: The Vapor-Locking Tendency of Aviation Gasolines, reprinted from the S.A.E. Journal for August 1930, pp. 5 and 6.

RICHARD C. QUEISSER, *Primary Examiner.*

EDWARD D. GILHOOLY, *Assistant Examiner.*